United States Patent
Cool

(10) Patent No.: US 7,623,635 B2
(45) Date of Patent: Nov. 24, 2009

(54) INTEGRATED TELEPHONY AND VIDEO SYSTEM

(76) Inventor: Kenneth J. Cool, 7290 Brixham Cir., Castle Rock, CO (US) 80108

(*) Notice: Subject to any disclaimer, the term of this patent is extended or adjusted under 35 U.S.C. 154(b) by 742 days.

(21) Appl. No.: 10/723,222

(22) Filed: Mar. 25, 2004

(65) Prior Publication Data
US 2004/0177378 A1    Sep. 9, 2004

Related U.S. Application Data

(63) Continuation of application No. 10/042,428, filed on Oct. 24, 2001.

(51) Int. Cl.
*H04M 11/00* (2006.01)
*H04N 7/173* (2006.01)

(52) U.S. Cl. .................. 379/102.03; 379/110.01; 379/93.23

(58) Field of Classification Search .......... 379/93.23, 379/90.01, 110.01, 102.02, 102.03, 142.14, 379/142.15, 142.16; 386/45, 46, 125, 126; 360/7; 725/106, 122
See application file for complete search history.

(56) References Cited

U.S. PATENT DOCUMENTS

| | | | | |
|---|---|---|---|---|
| 5,706,388 A * | 1/1998 | Isaka | .......... | 386/125 |
| 5,999,689 A * | 12/1999 | Iggulden | .......... | 386/46 |
| 5,999,691 A * | 12/1999 | Takagi et al. | .......... | 386/46 |
| 6,061,434 A * | 5/2000 | Corbett | .......... | 379/93.35 |
| 6,141,058 A * | 10/2000 | Lagoni et al. | .......... | 348/563 |
| 6,215,860 B1 * | 4/2001 | Johanson et al. | .......... | 379/88.28 |
| 6,259,441 B1 * | 7/2001 | Ahmad et al. | .......... | 715/720 |
| 6,549,619 B1 * | 4/2003 | Bell et al. | .......... | 379/210.02 |
| 6,762,797 B1 * | 7/2004 | Pelletier | .......... | 348/559 |
| 7,272,295 B1 * | 9/2007 | Christopher | .......... | 386/46 |
| 7,293,279 B1 * | 11/2007 | Asmussen | .......... | 725/102 |
| 2002/0172330 A1 * | 11/2002 | Brunelle et al. | .......... | 379/67.1 |
| 2003/0041332 A1 * | 2/2003 | Allen et al. | .......... | 725/106 |

* cited by examiner

Primary Examiner—Melur Ramakrishnaiah
(74) Attorney, Agent, or Firm—Pearne & Gordon LLP

(57) ABSTRACT

An integrated telephony and video system allows a viewer of a program to selectively accept a telephone call based on caller identification information and automatically buffer the program upon acceptance of the call. When the call is terminated, the buffered program is played from the point of interruption until the buffered program is the same as the real-time program. The system may store data about the call, such as the caller identification information and length of the call. Such data may be used to determine a compression format for the buffered program. Such data may also be used to generate a list of callers for whom the user desires to be interrupted while viewing the program.

14 Claims, 5 Drawing Sheets

INTEGRATED TELEPHONY AND VIDEO SYSTEM

CROSS REFERENCE TO RELATED APPLICATIONS

The present application is a continuation of U.S. patent application Ser. No. 10/042,428, entitled "Integrated Telephony and Video System", filed Oct. 24, 2001, which is herein incorporated by reference in its entirety.

FIELD OF THE INVENTION

The present invention relates to telephone and video signals, and in particular, to the integrated handling of telephone calls and video reception

BACKGROUND OF THE INVENTION

The telephone provides the ability to communicate quickly and efficiently. Just about anyone can be reached anywhere via existing telephone lines and cellular telephones. Many times, however, people do not wish to be disturbed, such as when viewing a favorite television program or movie. Caller ID provides some measure of choice regarding whose call to receive. If a viewer is expecting a call, or receives a call from someone important or hard to reach, the viewer may wish to take the call and miss part of the program. When a call is taken, the television program continues on, and the viewer's attention is divided between the call and the program, or parts of either are entirely missed.

There is a need for a system that can enable a viewer to receive important calls and provide their undivided attention to the caller. There is a need for a system that further enables a viewer to receive a call and yet still see an entire program

SUMMARY OF THE INVENTION

An integrated telephony and video system enables a viewer of a program to selectively receive and accept a telephone call based on caller identification information and automatically buffer the program upon receipt or acceptance of the call. When the call is terminated, the buffered program is displayed to the user from the point of interruption until the buffered program is the same as the real-time program.

The system includes a display that displays caller identification information upon receipt of a call. The system also includes a controller that detects when a user accepts the call and controls a buffer that buffers the program from the acceptance of the call. Upon termination of the call, the controller then provides the buffered program from the point of interruption (i.e., the point of receipt or acceptance of the call) until the buffered program coincides with the real-time program. In one embodiment, the system further includes a user input device, such as a remote control, for controlling viewing of the program and also for accepting and terminating the call. In another embodiment, the system may store data about the call, such as the caller identification information and length of the call. Such data is used to determine a compression format for the buffered program. Such data is also used to generate a list of callers for whom the user desires to be interrupted while viewing the program.

DETAILED DESCRIPTION OF THE INVENTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

Figure 1:
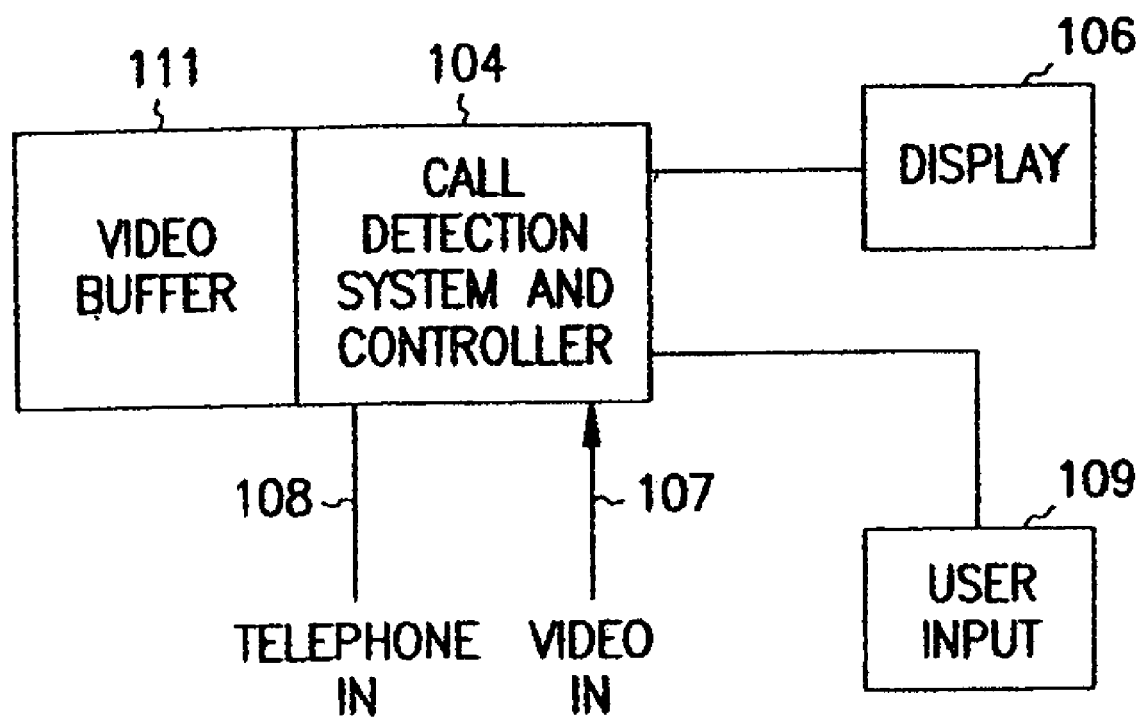
FIG. 1 is a block diagram of an integrated telephony and video system of the present invention.

In FIG. 1, a call detection system and controller 104 for a television, computer, or other display device 106 detects incoming calls and provides a user with the ability to accept the telephone call or to let the system 104 or a voice mail system handle the call. The system 104 is coupled to a video feed 107, such as cable, satellite, broadcast or other delivery system, and is also coupled to a telephone line 108, such as by an RJ-11 jack or other suitable connection for receiving telephone calls, including cordless and cellular telephone calls.

In one embodiment, the user is watching a television program and receives a telephone call. An indication is provided to the user, informing the user of the call and providing caller ID type information to the user via the display 106, another display which is incorporated into system 104 or separate from system 104, or audibly. The user provides an indication to accept the call at input 109. Input 109 may comprise a telephone receiver actuated by lifting the receiver in one embodiment, and may comprise a remote control device in a further embodiment. When a call is accepted, a video buffer 111 is used by system 104 to buffer the television program during the length of the call. In one embodiment, video buffer 111 may comprise a digital video recorder such as a TiVO® or Ultimate TV™ type digital video recorder or the like, and in an alternative embodiment, may comprise a hard disk drive or other memory or storage device of a computer. The video comprising the television program is compressed in one embodiment to conserve buffer space. When the call is finished, the television program is displayed from the video buffer 111 from the point of interruption. Buffering of the current television program continues until the display of the buffered program is the same as the current television program.

In various embodiments, system 104 is integrated into a video device such as VCR, DVD player, telephone, set top box, computer system, computer peripheral card, digital video recorder such as a TiVO® or Ultimate TV™ type digital video recorder or the like, A/V receiver or the television itself. Caller ID information is mixed or written over the incoming video signal 107 with subcircuits providing necessary interfaces such as RF and video.

Figure 2:
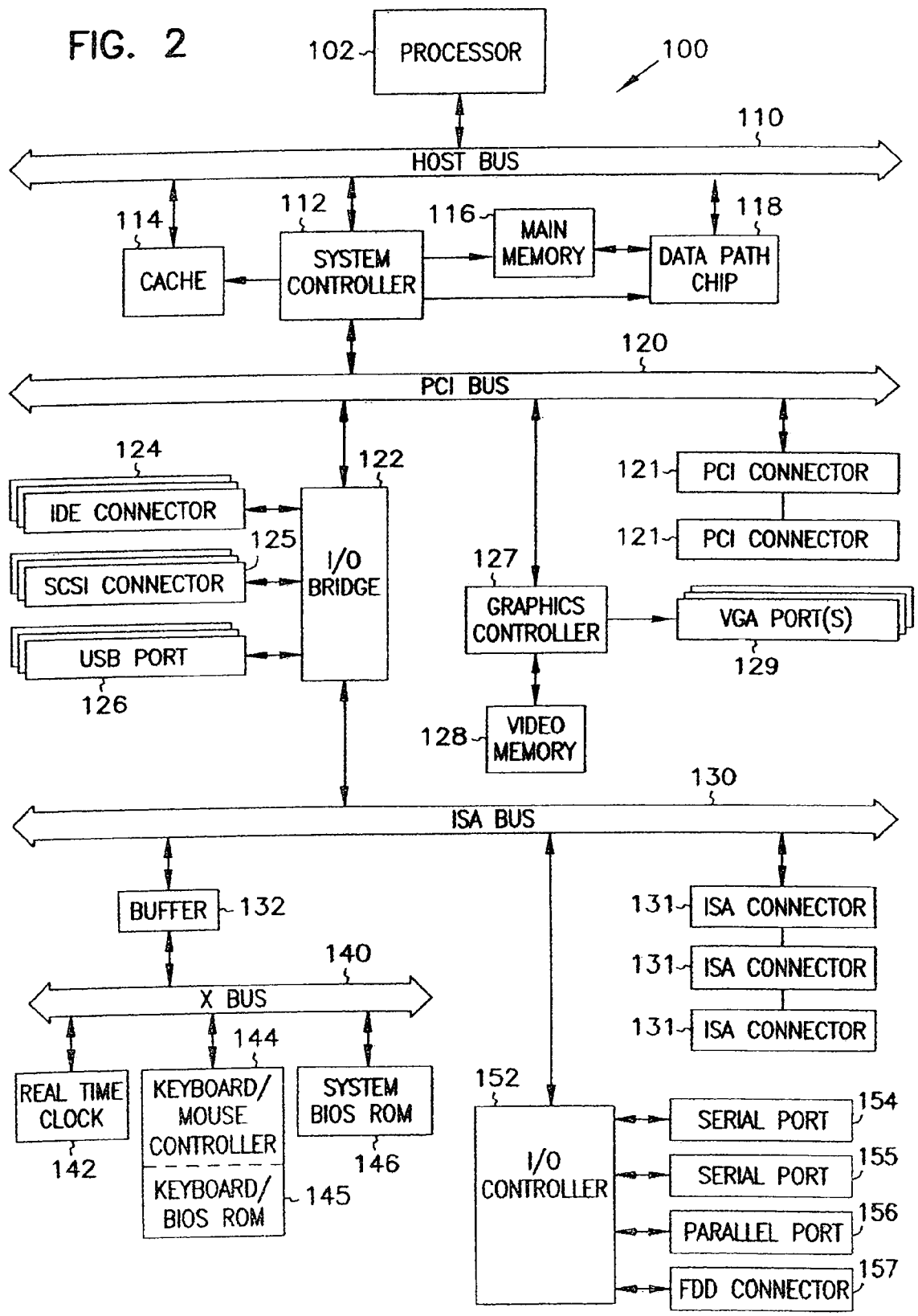
FIG. 2 is a block diagram of a computer system for integrating telephony and video.

FIG. 2 shows a block diagram of a video and telephony enabled personal computer system 100 that is used as the system 104 shown in FIG. 1 in one embodiment of the present invention. In this embodiment, a processor 102, a system controller 112, a cache 114, and a data-path chip 118 are each coupled to a host bus 110. Processor 102 is a microprocessor such as a 486-type chip, a Pentium®, Pentium® II, Pentium® III, Pentium® 4, or other suitable microprocessor. Cache 114 provides high-speed local-memory data (in one embodiment, for example, 512 kB of data) for processor 102, and is controlled by system controller 112, which loads cache 114 with data that is expected to be used soon after the data is placed in cache 114 (i.e., in the near future). Main memory 116 is coupled between system controller 112 and data-path chip 118, and in one embodiment, provides random-access memory of between 16 MB and 256 MB or more of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding many of the other components shown in FIG. 2. Main memory 116 includes standard DRAM (Dynamic Random-Access Memory), EDO (Extended Data Out) DRAM, SDRAM (Synchronous DRAM), or other suitable memory technology. System controller 112 controls PCI (Peripheral Component Interconnect) bus 120, a local bus for system 100 that provides a high-speed data path between processor 102 and various peripheral devices, such as graphics devices, storage drives, network cabling, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64-bit-wide data paths that run at higher speeds. In one embodiment, PCI bus 120 provides connectivity to I/O bridge 122, graphics controller 127, and one or more PCI connectors 121 (i.e., sockets into which a card edge may be inserted), each of which accepts a standard PCI card. In one embodiment, I/O bridge 122 and graphics controller 127 are each integrated on the motherboard along with system controller 112, in order to avoid a board-connector-board signal-crossing interface and thus provide better speed and reliability. In the embodiment shown, graphics controller 127 is coupled to a video memory 128 (that includes memory such as DRAM, EDO DRAM, SDRAM, or VRAM (Video Random-Access Memory)), and drives VGA (Video Graphics Adaptor) port 129. VGA port 129 can connect to industry-standard monitors such as VGA-type, SVGA (Super VGA)-type, XGA-type (eXtended Graphics Adaptor) or SXGA-type (Super XGA) display devices. Other input/output (I/O) cards having a PCI interface can be plugged into PCI connectors 121. Network connections providing video input are also represented by PCI connectors 121.

In one embodiment, I/O bridge 122 is a chip that provides connection and control to one or more independent IDE or SCSI connectors 124-125, to a USB (Universal Serial Bus) port 126, and to ISA (Industry Standard Architecture) bus 130. In this embodiment, IDE connector 124 provides connectivity for up to two standard IDE-type devices such as bard disk drives, CDROM (Compact Disk-Read-Only Memory) drives, DVD (Digital Video Disk) drives, videocassette recorders, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. At least one serial port 154 or 155 is coupled to a modem for connection to a telephone system. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

Figure 3:
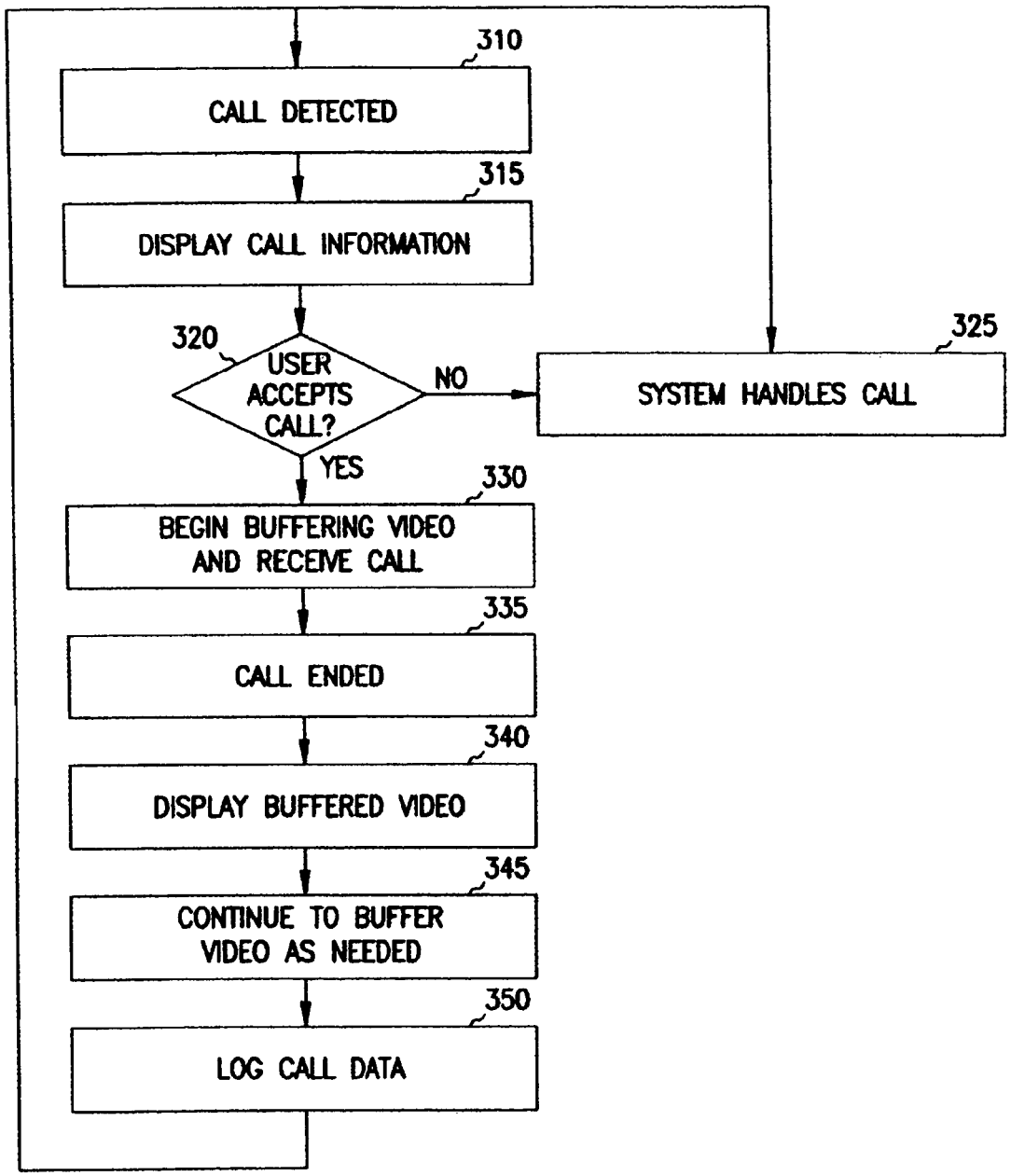
FIG. 3 is a flowchart showing the handling of a call by the integrated telephony and video system of FIG. 1.
Figure 4:
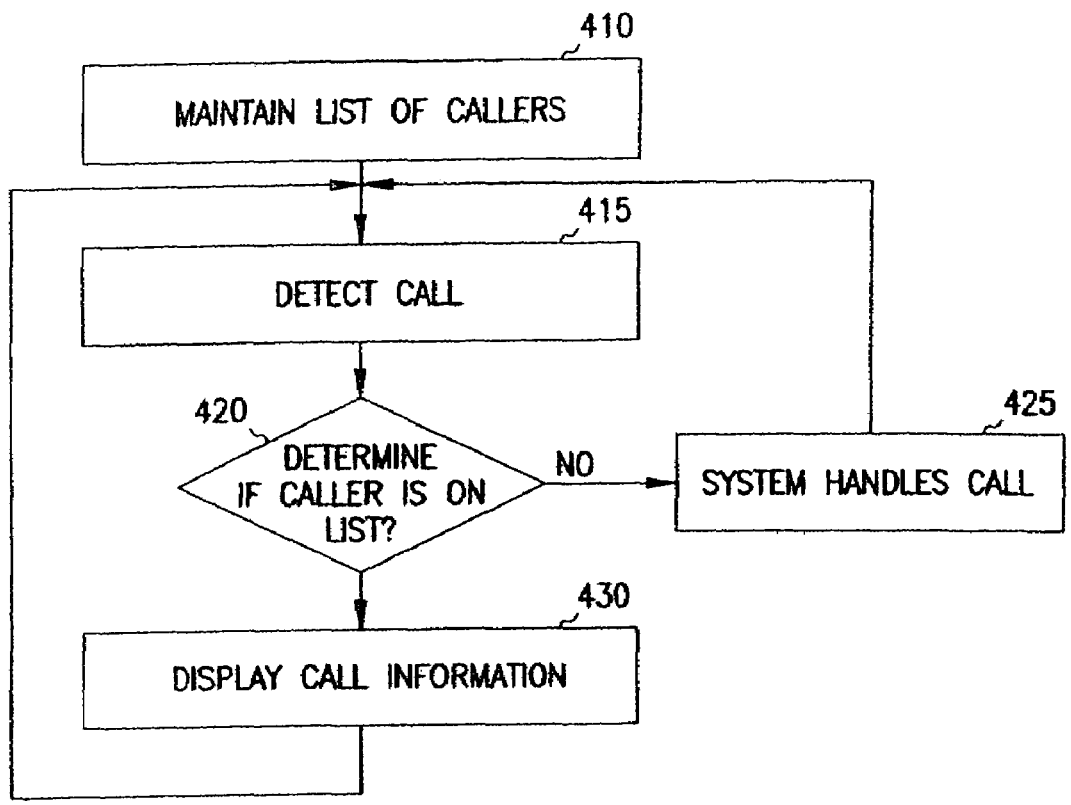
FIG. 4 is a flowchart showing the use of a list of callers by the integrated telephony and video system of FIG. 1.

The integrated system 104 shown in FIG. 1 performs several functions identified in flowcharts of FIGS. 3 and 4. Such functions are implemented in software in one embodiment, where the software comprises computer executable instructions stored on computer readable media such as disk drives coupled to connectors 124 or 125, and executed from main memory 116 and cache 114.

In FIG. 3, a telephone call is detected at step 310 while a user is watching television, downloading media from a network such as the Internet, viewing locally stored video or listening to locally stored audio. The call may be in the form of a PSTN phone call, or alternatively, an Internet phone call. The system is equipped with caller ID functions, and displays the call information at step 315 or provides an audible annunciation thereof. In one embodiment, the call information is displayed on the display device where the viewer is watching a television program or movie. For example, referring to FIG. 1, the information is displayed along the bottom of the display 106 or elsewhere in an unobtrusive manner. In further embodiments, the information is displayed on a display separate from the display 106 such as one integrated into call detection system and controller 104.

At step 320, the viewer or user is provided the ability to accept the call based on the caller ID information displayed. If the user desires not to accept the call, the system 104 handles the call by taking a message or forwarding the call in accordance with a predetermined protocol at step 325. The system then waits for another call at step 310.

If the user accepts the call at step 320, the call is put through or received at step 330. In one embodiment, the system includes a standard user telephone handset. In further embodiments, a headset is utilized. At approximately the same time that the call is accepted, video comprising the program or movie is stored in buffer 111, at which time the display of the currently received video is discontinued. Audio being received or played is automatically muted in one embodiment. Alternatively, locally stored audio and video is automatically paused during the length of the call. This buffering of the video continues until the call is ended at step 335. Once the call is ended, the buffered video is played back on the display from the point at which it was interrupted. Standard video controls, such as fast forward and rewind, are provided via user input device 109. Such input device 109 may comprise a remote control in one embodiment. Using the video controls, portions of the video may be skipped or fast forwarded if desired. Further, commercials are not buffered in one embodiment, and video time compression is used if desired. The buffering of the real time video signal continues until the display of buffered video is the same as the real time video signal in step 345. This occurs when the program ends, or if portions of the buffered video were played faster than originally received. Data from the call, including length of the call and caller ID, is logged by the system at step 350. The system then awaits another call at step 310.

In an alternative embodiment, buffering of the video or audio signals being observed occurs at the point of presentation of the caller ID information. This allows a user to fully consider the caller ID information and decide whether or not to accept a call without worrying about missing an important sequence. In a further embodiment, several seconds or other predetermined time of the video or audio signals are always buffered such that replay of the buffered signals following a call occurs from a point several seconds prior to the first indication of the call.

In one embodiment, the video signal being buffered is compressed in accordance with standard video compression techniques, such as MPEG II. In a further embodiment, the compression ratio is selected based on the expected length of the call. If a call is accepted from a caller whose calls usually last longer than other callers as reflected in a maintained call log, the compression ratio is increased to ensure that sufficient video is buffered. If another call is accepted prior to the catching up of the buffered video to the real time video, the process repeats at step 310, and the playing of the buffered video is stopped until the call is completed.

Additional functions provided by the system involve the use of lists of desired callers as shown in the flowchart of FIG. 4. A list of callers for whom a user desires to be interrupted while watching a television program is maintained at step 410. The list is provided by the user in one embodiment. In further embodiments, the history of user accepted calls is used to determine a list of callers. A threshold percentage such as 50% of previously accepted calls from a caller during program watching by the user results in a person being added to the list. In still further embodiments, a user identifies callers for the list prior to each program or sequence of programs being watched. Callers whose calls are accepted less than the threshold are dropped from the list.

A call is detected at step 415, and the system determines if the caller is on the list at step 420. If the caller is not on the list, the system handles the call at step 425 as previously described without interrupting the user and the system waits for the next call. If the caller is on the list, the system either displays the call information at step 430 as previously described with reference to FIG. 3 and provides the user the ability to either handle or reject the call in the same manner, or the call is automatically answered after a predetermined interval, and program video is buffered for viewing.

Figure 5:
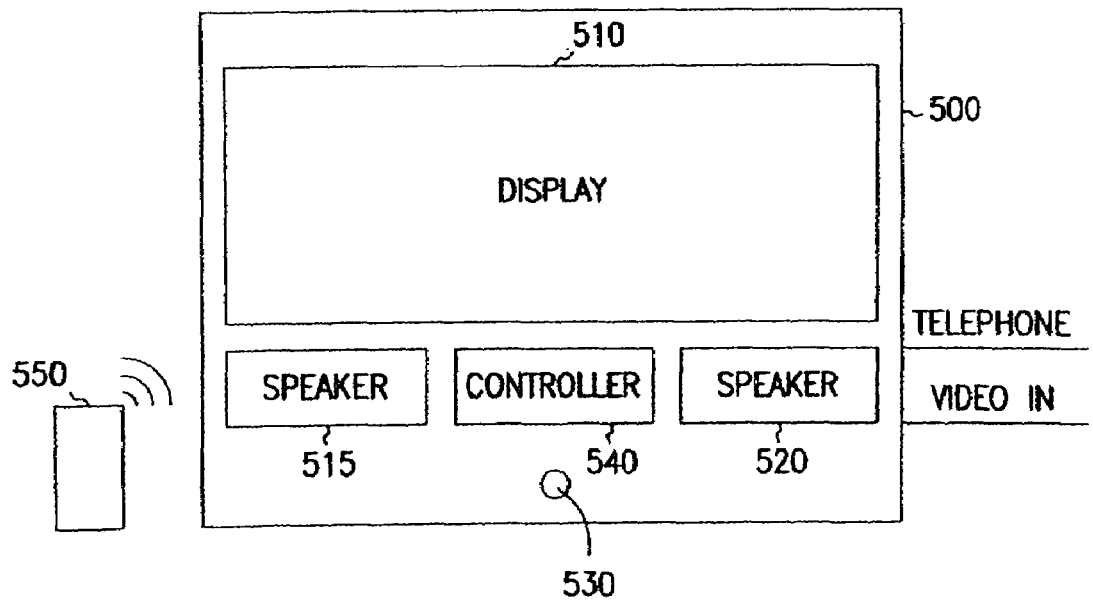
FIG. 5 is a block diagram of an alternative embodiment of the integrated telephony and video system.

An alternative embodiment of the integrated telephony and video system 500 is shown in FIG. 5. System 500 is self contained and comprises a single cabinet 500, such as an enhanced television, or computer system with display device 510 functioning as a speaker phone. Speakers 515 and 520 provide both audio for the video programs and functioning for telephone calls at the same time. A microphone 530 picks up user voice and other sounds for telephone calls. The system 500 is coupled to a standard telephone line and video input. A controller 540 provides the integration functions described with respect to FIGS. 3 and/or 4. A remote control 550 is used to select whether or not to answer a call, scroll through current and past caller ID information, and to control the replaying of buffered video using standard video controls. Answering a call is accomplished by selecting a dedicated key on the remote control 550, or positioning a cursor displayed with the caller ID information on the display and selecting an answer call option. A further option to remove the call information from the display is also provided.

Figure 6:
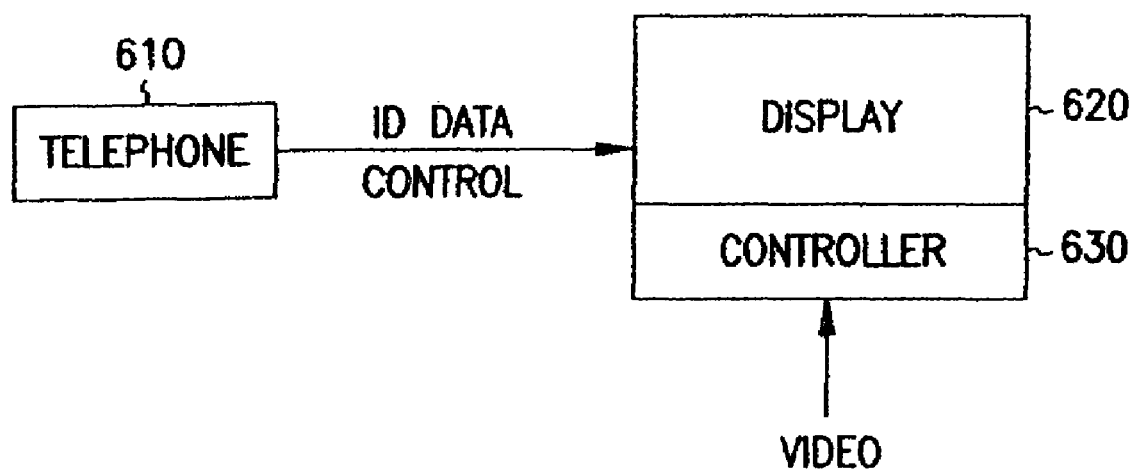
FIG. 6 is a block diagram of a further alternative embodiment of the integrated telephony and video system.

Yet a further embodiment is shown in FIG. 6, with a separate telephone/adapter 610, display device 620 and controller 630. In this embodiment, the telephone 610 is connected to a POTS RJ-11 jack or is a cordless or cellular telephone 610 receiving caller ID information regarding an incoming call. The caller ID information ("ID DATA") is provided to the controller 630 in one version and displayed on display 620. Alternatively, the caller ID information is displayed on a display incorporated into the telephone/adapter 610. If the call is answered on the telephone 610, control information ("CONTROL") is sent to the controller causing it to stop displaying video, and to buffer the video from the point that the call is answered. In the case of a connected or cordless telephone, the controller 630 is alternatively coupled to the telephone line and detects when a call is answered rather than receiving a separate indication that the call has been answered.

An integrated telephony and video system allows a viewer of a program to selectively receive and accept a telephone call based on caller identification information and automatically buffer the program upon the receipt or acceptance of the call. When the call is terminated, the buffered program is displayed to the user from the point of interruption (i.e., the point of receipt or acceptance of the call) until the buffered program is the same as the real-time program. This application is intended to cover any adaptations or variations of the present invention. While the invention has been described in terms of buffering video programs, other types of entertainment or work, may also be buffered in the same manner. Further, while several embodiments have been described, other configurations may also make use of the methods herein, including handheld television and telephone combinations and other configurations. It is manifestly intended that this invention be limited only by the claims and equivalents thereof.

The invention claimed is:

1. A system for providing uninterrupted viewing of a real-time program during a telephone call from a caller to a user, the system comprising:
    a display capable of displaying caller identification information upon receipt of the call;
    a controller capable of detecting acceptance and termination of the call by the user; and
    a buffer coupled to the controller, wherein the buffer is capable of buffering the real-time program from the acceptance of the call and providing the buffered program to the user upon the termination of the call until the buffered program coincides with the real-time program;
    a memory capable of storing data about the call; the data including at least one of the caller identification information and length of the call, the buffer being capable of buffering the program in a compressed format, the compressed format being selected based on the stored data about the call.

2. The system of claim 1, wherein the display is coupled to the buffer and is further capable of displaying the buffered program to the user.

3. The system of claim 1, further comprising a video display device coupled to the buffer, wherein the video display device is capable of displaying the buffered program to the user.

4. The system of claim 1, wherein the memory is further capable of storing a caller list, the caller list being generated based on the stored data about the call.

5. The system of claim 4, wherein the caller is included in the caller list of the stored data about the call indicates that at least a predetermined percentage of the caller's calls were accepted by the user.

6. The system of claim 4, wherein the caller identification information is displayed only if the caller is included in the caller list.

7. The system of claim 4, wherein the controller is further capable of automatically accepting the call if the caller is included in the caller list.

8. The system of claim 1, further comprising a user input device for controlling viewing of the program and for accepting and terminating the call by the user.

9. The system of claim 1, wherein the controller is further capable of automatically muting audio associated with the program upon the acceptance of the call by the user.

10. A method of providing uninterrupted viewing of a real-time program during a telephone call from a caller to a user, the method comprising:

displaying caller identification information upon receipt of the call;

detecting acceptance of the call by the user;

buffering the real-time program from the acceptance of the call;

storing data about the call, the data including at least one of: the caller identification information and length of the call; and displaying the buffered program to the user upon the termination of the call until the buffered program coincides with the real-time program;

wherein the program is buffered in a compressed format, the compressed format being selected based on the stored data about the call.

11. The method of claim 10, further comprising generating a caller list based on the stored data about the call.

12. The method of claim 11, wherein the caller identification information is displayed only if the caller is included in the caller list.

13. The method of claim 11, further comprising automatically accepting the call if the caller is included in the caller list.

14. The method of claim 10, wherein the caller is included in the caller list if the stored data about the call indicates that at least a predetermined percentage of the caller's calls were accepted by the user.

\* \* \* \* \*